United States Patent
Giltrow et al.

[15] 3,674,689
[45] July 4, 1972

[54] CARBON FIBER FILLED COMPOSITE MATERIALS

[72] Inventors: Jeremy Peter Giltrow, Bordon; George Henry Kinner, Fleet; John Keith Lancaster, Reading, all of England

[73] Assignee: National Research Development Corporation, London, England

[22] Filed: June 23, 1970

[21] Appl. No.: 49,153

[30] Foreign Application Priority Data

June 25, 1969 Great Britain......................31,999/69

[52] U.S. Cl.............................................................252/12.4
[51] Int. Cl. ..........................................................C10m 0/52
[58] Field of Search ........................252/12, 12.2, 12.4, 12.6

[56] References Cited

UNITED STATES PATENTS

| | | |
|---|---|---|
| 3,455,864 | 7/1969 | Dodson et al..........................252/12.4 |
| 3,059,769 | 10/1962 | Frost......................................252/12.4 |
| 3,071,637 | 1/1963 | Horn et al..............................252/12.4 |
| 3,310,387 | 3/1967 | Sump......................................252/12 |
| 3,437,458 | 4/1969 | Volker et al.............................252/12 |
| 3,473,900 | 10/1969 | Sara.......................................252/12.4 |

OTHER PUBLICATIONS

Fiber Reinforcement of Metals by Kelly Ministry of Aviation, 1965, pages 1 & 17

Primary Examiner—Daniel E. Wyman
Assistant Examiner—I. Vaughn
Attorney—Cushman, Darby & Cushman

[57] ABSTRACT

At least the contacting surface of a bearing component is a composite material wherein metal coated carbon fibers are incorporated as reinforcement in a matrix of synthetic resin. Such bearing components have low wear rates and show low friction.

17 Claims, 3 Drawing Figures

CARBON FIBER FILLED COMPOSITE MATERIALS

The present invention relates to carbon fiber reinforced plastics, to processes for their manufacture and to their use as bearing components.

A bearing component is one which in operation is in sliding or rolling contact with another such component in a mechanism and includes, but is not limited to, gear wheels, shafts or sleeves for cylindrical journal bearings, rolling elements and cages or retainers for rolling element bearings, piston rings and machine slideways.

The part of the bearing component which in operation partakes in the rolling or sliding contact above referred to may be termed the contacting surface and advantageously at least the contacting surface of a bearing component is of a material having a relatively low coefficient of friction and a relatively low rate of wear.

British Pat. Specification No. 1,166,253 discloses the use of composite materials in at least the contacting surface of a bearing component as aforesaid. In such composite materials carbon fibers are incorporated as reinforcement in a matrix of synthetic resin.

In accordance with the present invention a bearing component as hereinbefore defined has at least at its contacting surface a composite material wherein metal coated carbon fibers are incorporated as reinforcement in a matrix of synthetic resin. The entire bearing component may be of such composite material.

Carbon fibers for the production of bearing components as aforesaid may be produced by carbonization of fibrous organic material but are preferably high strength, high Young's Modulus carbon fibers obtained by the conversion of tows of organic polymer fiber under the influence of heat and longitudinal tension. Such carbon fibers may be obtained by the influence of heat and tension upon synthetic polymeric fiber, for example, polyacrylonitrile, as disclosed in one or more of British Pat. Specifications Nos. 1,110,791, 1,148,874, 1,166,251 and 1,166,252. Carbon fibers produced by these processes have ultimate tensile strength of at least $100 \times 10^3$ pounds per square inch and a Young's Modulus of at least $12 \times 10^6$ pounds per square inch.

High strength, high Young's Modulus carbon fibers are polycrystalline in nature and individual fibers are generally between 5 and 15 $\mu$ in diameter. Although produced in continuous lengths the carbon fibers may be coated and incorporated in the synthetic resin as short lengths in which case their length should be at least 20 times their diameter. Particularly preferred carbon fibers for use in bearing components of the present invention are the carbon fibers known by those skilled in the art as Type II carbon fibers. These fibers are produced by oxidation under tension at temperatures of the order of 200°–250°C followed by carbonization at a temperature of up to 1,500°C to yield carbon fibers having an ultimate tensile strength of the order of 350 to $450 \times 10^3$ pounds per square inch and a Young's Modulus of the order of 30 to $45 \times 10^6$ pounds per square inch.

The coating of metal on the carbon fiber may be up to $10\mu$ in thickness; a convenient working range is of the order of $0.2\mu$ to $2\mu$ and advantageous results have been obtained with metal films having a thickness in the region of $1\mu$. The metal coating is applied to the carbon fiber prior to incorporation in the resin matrix and may be applied by any convenient method. Electroless plating or electroplating may both be used although the particular method used will depend upon the metal to be plated on to the carbon fibers. For example, copper may be deposited by an electroless method or by electrolytic tumble-plating.

Synthetic resin materials that may be used as matrix material for bearing components of the present invention include thermoset resins such as phenolic, epoxy, Friedel-Crafts, polyimide or polybenzimidazole resin and thermoplastic resins such as acrylic, polyamide, polyacetal, polycarbonate, polyolefins such as polyethylene, polypropylene or polystyrene, fluorocarbons, such as polytetrafluoroethylene, polyphenylene oxide, and polysulphone resin, and polytetrafluoroethylene (hereafter PTFE) is a preferred matrix material.

By Friedel-Crafts resin is meant the product of a condensation reaction between an aromatic compound having at least two halogenomethyl (preferably chloremethyl) or alkoxymethyl (preferably methoxymethyl) groups attached directly to an aromatic nucleus and an aromatic compound having at least two nuclear hydrogen atoms available for and activated toward such condensation reaction as disclosed in British Pat. Nos. 1,024,222 and 1,094,181.

It has been found that a particularly useful composite material for bearing components of the present invention comprises metal coated carbon fibers incorporated as reinforcement in a matrix of PTFE, said carbon fiber being Type II carbon fiber (as hereinbefore defined) and said metal coating being copper or nickel of thickness of the order of $0.2\mu$ to $2.0\mu$. The proportion of metal coating may alternatively be expressed as a volume percentage and it has been found that advantageous results are obtained with 2.5 to 15 percent by volume of metal coating and preferably 5 percent by volume are used.

The composite material may also include additional components to provide improved properties. For example, to reduce the coefficient of friction lamellar solids (graphite or dichalcogenides of elements in Groups Va or VIa of the periodic table) may be added, particularly molybdenum disulphide. Also powdered metals (bronze, silver, nickel, cobalt, or lead) may be added. For example it has been found that the addition of lead improves the transfer properties of the composite material and provides improved materials for cages or retainers in rolling element bearings that are run dry. These further additions are in general not more than 25 percent by weight of the composite bearing material.

The proportion of carbon fiber in the reinforced composite material required to reduce friction and wear does not appear to be particularly critical. Advantageous results are obtained with 10 to 40 percent by weight of carbon fiber and preferred results are obtained when PTFE is the matrix and includes 20 percent by volume of carbon fiber and 5 percent by volume of metal.

Components of the present invention will now be described with reference to the accompanying drawings in which.

Figure 1:
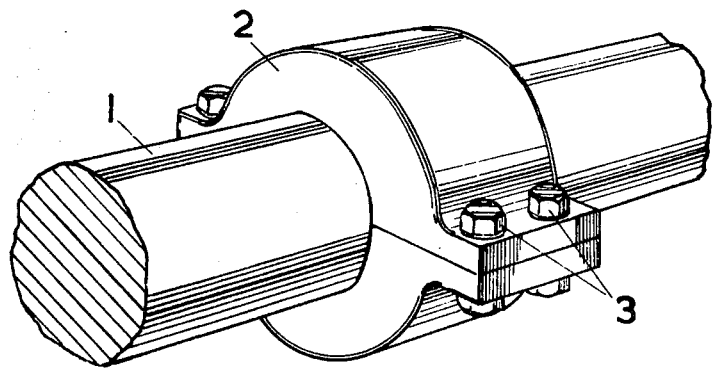
FIG. 1 is a perspective view of a simple cylindrical journal bearing.
Figure 2:
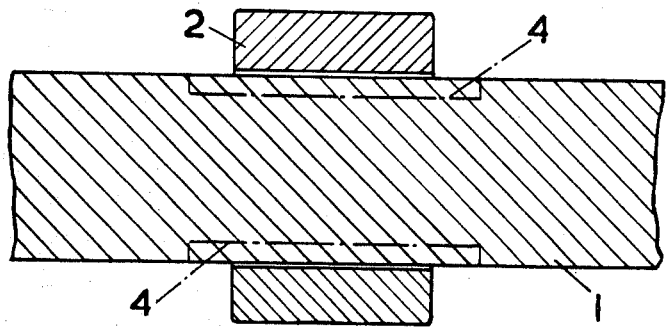
FIG. 2 is a longitudinal cross-section of the journal bearing in FIG. 1.

FIGS. 1 and 2 show a shaft 1 mounted in a sleeve 2 which is in two halves held together by bolts 3. The shaft or sleeve or both may be of composite materials as hereinbefore described. Alternatively the shaft may be of steel, or other conventional material and have an inset of composite material as illustrated by the chain dotted line 4. Likewise the sleeve 2 may be entirely of composite material, or it may be mainly of conventional materials with an inset of composite material so that the sliding contact at the bearing surface is upon composite material as hereinbefore disclosed.

Figure 3:
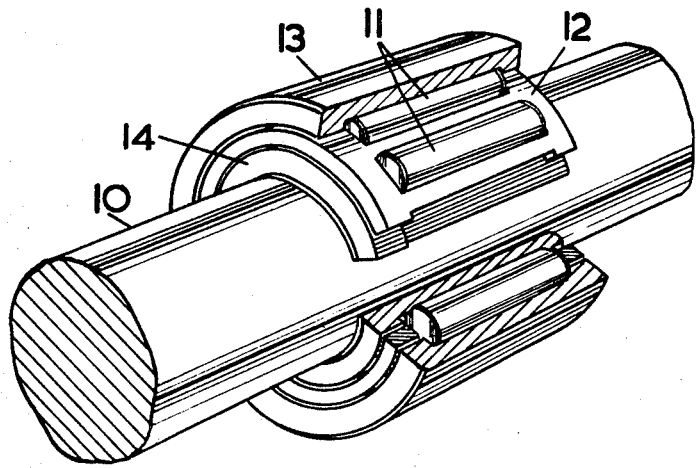
FIG. 3 is a perspective view of a simple rolling element bearing shown in partial cross-section.

FIG. 3 shows a rolling element bearing consisting of an inner race 14 and an outer race 13 adapted to rotate relative to one another on rolling elements 11 which are maintained at a desired separation from one another by means of a cage 12. The inner race 14 is attached to a shaft 10 by conventional means (not shown) and the outer race may be attached to a stationary part so that the shaft 10 is permitted free rotation with respect to the stationary part. Any one, or more of the components of the rolling element bearing above described may be of composite material of the present invention, or may have their contacting surfaces of such material.

Rolling element bearings in which the cage is of composite material as hereinbefore described have been found to be particularly useful when run dry because of the low wear rate and low friction of the composite material. Situations in which it may be desired to run such bearings dry include food processing machinery, when the escape of lubricant could contaminate the product and use in particularly rigorous conditions such as in vacuum or under extreme cold where lubricants may be useless.

There will now be described, also by way of example only, the production of composite materials in which metal coated carbon fiber is incorporated as reinforcement in a matrix of synthetic resin material, including processes of metal coating the carbon fibers, together with the results of simple tests illustrative of the usefulness of such composite materials when used as components in bearings etc. disclosed hereinabove.

Carbon fibers may be coated with copper by the proprietary electroless Alkaplas process of the Alkan Co. Ltd. which comprises broadly formaldehyde reduction of a complex copper salt at 65°–75°F, after suitable sensitizing of the surface to be coated.

Carbon fibers may be coated with nickel by the following process in which 0.55 g of chopped carbon fibers are immersed in a sensitizing solution of palladium (II) chloride (0.1 g) in 0.880 ammonia (50 ml). The carbon fibers are then washed in distilled water and transferred to a bath containing nickel chloride hexahydrate (15 g), sodium citrate (50 g) and ammonium chloride (25 g) in 500 ml water. This plating solution is contained in a PTFE or polypropylene beaker and stirred with a polyethylene stirrer. The pH is adjusted to between 8 and 10 with 0.880 ammonia and the temperature maintained between 70° and 80°C.

The fibers are uniformly dispersed in the solution and 25 ml of a reducing solution of sodium hypophosphite (40 percent wt) is added. Hydrogen is evolved and the evolution maintained by further additions of nickel chloride and sodium hypophosphite until sufficient nickel is deposited to obtain the desired thickness of nickel deposited upon the carbon fiber. The plated fibers are filtered, washed and vacuum dried at 80°C.

The thickness of metal deposited upon the carbon fibers is determined by the length of time for which the carbon fibers remain in the plating bath.

The metal plated carbon fibers obtained as described above may be incorporated in a polymer matrix by any conventional method, for example by stirring a water suspension of polymer powder and plated carbon fibers until thorough mixing has taken place and then filtering off the plated carbon fiber/polymer mixture for drying and compaction by conventional means. Bearings may be produced by compacting the composite in a mould of suitable shape and the composite may be machined to the finally desired shape.

However care must be exercised to ensure that the handling, stirring etc. of the plated carbon fibers is kept to a minimum to ensure that the least possible mechanical damage is done to the metal coating. Furthermore the plated carbon fibers should be used as soon as possible after coating to minimize oxidation, this is particularly important when the coating is copper. Alternatively the plated carbon fibers may be stored under an inert atmosphere or in vacuo.

Composites of plated carbon fibers in PTFE were prepared in the form of cylinders one-fourth in. dia. and 1 in. long which were tested for wear by loading the curved surface of the cylinder against the curved surface of a 1 in. (or 4 in.) diameter rotating ring of mild steel (BS 15). The surface of the steel was finished to a roughness of 6 $\mu$in., c.l.a., and cleaned with organic solvent. The surface of the compact was prepared by dry abrasion on fine carborundum paper and particular care was taken to avoid contact with any fluid. The volume of wear was calculated from measurements of the diameter of wear scar on the compact at periodic intervals of time. A load of 1 kg was used, at a speed of sliding of 50 cm/s.

Table 1 shows the variation of wear rate of a PTFE/carbon fiber composite, wherein the carbon fiber is Type I carbon fiber i.e. having a UTS of 300 × 10$^3$ p.s.i. and Young's Modulus of 60 × 10$^6$ p.s.i., and is present in a proportion of 25 percent by weight. The sample in the first line is a control sample with no metal coating on the carbon fibers; the sample in the second line contains carbon fibers coated with nickel equivalent to a 12 percent volume addition and the carbon fibers in the sample in the bottom line are copper coated, equivalent to a 2.5 percent volume addition.

The carbon fibers were metal coated by electroless deposition which leads to the production of a certain amount of relatively loose metal powder in addition to the metal coated onto the carbon fibers. This loose metal may be incorporated into the composite and may reach as high a proportion as 50 percent by volume of the total metal included, but is normally considerably less.

TABLE 1

| Sample | Wear rate |
|---|---|
|  | 10$^{-10}$cm$^3$/cm kg |
| Control | 4 |
| + 12% v/v Nickel | 0.5 |
| + 2.5% v/v Copper | 0.3 |

The results quoted in Table 1 relate to high nominal stress, ie greater than 100 p.s.i. At lower stresses the effects of metal plated carbon fiber are less marked. Coefficients of friction remain substantially unchanged at about 0.2 regardless of stress.

Table 2 shows the variation in wear rate and coefficient of friction of a PTFE/carbon fiber composite, wherein the carbon fiber is Type II carbon fiber ie having a U.T.S. of 400 × 10$^3$ p.s.i. and Young's Modulus of 30 × 10$^6$ p.s.i. and is present in a proportion of 25 percent by weight. The sample in the upper line is a control with no metal plating and the carbon fibers in the sample in the lower line are copper coated to an equivalent of a 5 percent volume addition. The coefficient of friction of this sample is also reduced.

TABLE 2

| Sample | Wear Rate | Coefficient of friction |
|---|---|---|
|  | 10$^{-10}$ cm$^3$/cm kg |  |
| Control | 0.8 | 0.55 |
| +5% v/v Copper | 0.06 | 0.2 |

Other properties, e.g. thermal expansion coefficient, deformation under load, etc. are marginally improved metal plating of the carbon fibers, and thermal conductivity is appreciably increased.

The carbon fibers used in the present invention may be other than those prepared in accordance with the above mentioned British Patent specification. Also other metals, e.g. silver and cobalt and resins than those disclosed in the foregoing examples may be used.

We claim:

1. A bearing component of which at least the contacting surface is a composite material wherein metal coated carbon fibers are incorporated as reinforcement in wear and friction reducing proportions in a matrix of synthetic resin.

2. A bearing component as claimed in claim 1 wherein the carbon fiber has an ultimate tensile strength of at least 100 × 10$^3$ lb/sq in and a Young's Modulus of at least 12 × 10$^6$ lb/sq in.

3. A bearing component as claimed in claim 1 wherein the carbon fiber is Type II carbon fiber.

4. A bearing component as claimed in claim 1 wherein the carbon fiber content is of the order of 10 to 40 percent by weight.

5. A bearing component as claimed in claim 1 wherein the metal coating on the carbon fiber has a thickness of the order of 0.2$\mu$ to 2$\mu$.

6. A bearing component as claimed in claim 1 wherein the metal coating is copper or nickel.

7. A bearing component as claimed in claim 1 wherein the synthetic resin matrix material is a thermoset resin.

8. A bearing component as claimed in claim 6 wherein the synthetic resin material is a phenolic, epoxy, Friedel-Crafts, polyimide or polybenzimidazole resin.

9. A bearing component as claimed in claim 1 wherein the synthetic resin matrix material is a thermoplastic resin.

10. A bearing component as claimed in claim 9 wherein the synthetic resin material is an acrylic, a polyamide, a polyacetal, a polycarbonate, a polyolefin, a fluorocarbon, a polyphenylene oxide or a polysulphone resin.

11. A bearing component as claimed in claim 10 wherein the synthetic resin material is polyethylene, polypropylene, polystyrene or polytetrafluoroethylene.

12. A bearing component of which at least the contacting surface is a composite material wherein metal coated carbon fibers are incorporated as reinforcement in a matrix of synthetic resin said carbon fiber constituting about 10 to 40 percent by weight of the composite and the layer of metal coating being about $0.2\mu$ to $2\mu$.

13. A bearing component as claimed in claim 12 wherein the matrix is polytetrafluoroethylene and the carbon fiber is Type II carbon fiber.

14. A bearing component of which at least the contacting surface is a composite material wherein metal coated carbon fibers are incorporated as reinforcement in a matrix of polytetrafluoroethylene, said carbon fibers being Type II carbon fibers constituting 20 percent by volume of the composite and said metal coating being copper constituting about 5 percent by volume of the composite.

15. A bearing component as claimed in claim 1 wherein there is included up to 25 percent by weight of a lamellar solid lubricant or of a powdered metal lubricant.

16. A bearing component as claimed in claim 15 wherein the lamellar solid is graphite or molybdenum disulphide.

17. A bearing component as claimed in claim 15 wherein the powdered metal is bronze silver, nickel, cobalt or lead.

* * * * *